United States Patent
Saha et al.

(10) Patent No.: US 12,450,474 B2
(45) Date of Patent: Oct. 21, 2025

(54) SYSTEMS AND METHODS FOR NUMERICAL REASONING BY A PARTIALLY SUPERVISED NUMERIC REASONING MODULE NETWORK

(71) Applicant: Salesforce, Inc., San Francisco, CA (US)

(72) Inventors: Amrita Saha, Singapore (SG); Shafiq Rayhan Joty, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 1194 days.

(21) Appl. No.: 17/162,289

(22) Filed: Jan. 29, 2021

(65) Prior Publication Data

US 2022/0108169 A1 Apr. 7, 2022

Related U.S. Application Data

(60) Provisional application No. 63/086,851, filed on Oct. 2, 2020.

(51) Int. Cl.
G06N 3/08 (2023.01)
G06N 3/04 (2023.01)

(52) U.S. Cl.
CPC ............... *G06N 3/08* (2013.01); *G06N 3/04* (2013.01)

(58) Field of Classification Search
CPC .................................. G06N 3/08; G06N 3/04
See application file for complete search history.

(56) References Cited

U.S. PATENT DOCUMENTS

| | | | |
|---|---|---|---|
| 2016/0246779 A1* | 8/2016 | Ho .......................... | G06F 40/30 |
| 2019/0370391 A1* | 12/2019 | Ezen Can ................ | G06N 7/01 |
| 2021/0406669 A1* | 12/2021 | Yu .......................... | G06N 3/044 |
| 2022/0043981 A1* | 2/2022 | Liang ...................... | G06N 3/045 |
| 2022/0067540 A1* | 3/2022 | Ferrucci ................... | G06N 5/04 |

\* cited by examiner

*Primary Examiner* — Jennifer N Welch
*Assistant Examiner* — Amy P Hoang
(74) *Attorney, Agent, or Firm* — Haynes and Boone, LLP (57) ABSTRACT

Embodiments described herein provide systems and methods for a partially supervised training model for questioning answering tasks. Specifically, the partially supervised training model may include two modules—a query parsing module and a program execution module. The query parsing module parses queries into a grogram, and the program execution module execute the program to reach an answer through explicit reasoning and partial supervision. In this way, the partially supervised training model can be trained with answers as supervision, obviating the need for supervision by gold program operations and gold query-span attention at each step of the program.

20 Claims, 9 Drawing Sheets

Algorithm 1: WNSMN Algorithm

Input: (Query ($q$), Passage ($p$)) = $x$
Output (or Supervision): Answer($y$) $\in \mathbb{R}$

Preprocessing:
351 $\{$
$[num_1, num_2, \ldots, num_N] = Num = \text{Extract-Numbers}(p)$   // Number and Date
$[date_1, date_2, \ldots, date_D] = Date = \text{Extract-Dates}(p)$   // Entity and Passage Mentions

Inference:
352 $\{$
$[(q_1, ref_1), \ldots, (q_k, ref_k), \ldots, (q_l, ref_l)] = Program = \text{Query-Parsing}(q)$
for step $(q_k, ref_k) \in Program$ do
   $(A_k^{num}, T_k^{num}), (A_k^{date}, T_k^{date}) = \text{Entity-Attention}(q_k, p, ref_k, Num, Date)$   [2.1]
end for
$\mathcal{L}_{aux}^{num}, \mathcal{L}_{aux}^{date} = \text{Entity-Inductive-Bias}(\mathbf{A}^{num}, \mathbf{A}^{date})$   Equation [1]
$\mathcal{L}_{aux} = \mathcal{L}_{aux}^{num} + \mathcal{L}_{aux}^{date}$ 353 $\{$
$q_l = \text{Query Span Argument of Last Step}$   // Program Arguments and Stacked Attention
$ref_l = \text{Reference Argument of Last Step}$   // Map over Entities for Last Step
$T^{num} = \{T_k^{num} | k \in ref_l\}, T^{date} = \{T_k^{date} | k \in ref_l\}$
$Operators = \{op_1, op_2, \ldots, op_{k_1}\} = \text{Operator-Predictor}(q_l, q)$   // Operator and EntityType
$EntTypes = \{type_1, type_2, \ldots, type_{k_1}\} = \text{Entity-Type-Predictor}(q_l, q)$   // Sampling
$Actions = \{\}$   // Action Sampling for each Operator
for $op, type \in (Operators, EntTypes)$ do
   if $type$ is Number then
      $T = T^{num}$
   else if $type$ is Date then
      $T = T^{date}$
   end if
   if $op$ is diff then
      if $|ref_l| == 2$ then
         $arg1 = \{arg1_1, arg1_2, \ldots, arg1_{k_2}\} = \text{Sample-1-Argument}(T_0)$
         $arg2 = \{arg2_1, arg2_2, \ldots, arg2_{k_2}\} = \text{Sample-1-Argument}(T_1)$
         $args = \{(a1, a2) | (a1, a2) \in (arg1, arg2)\}$
      else if $|ref_l| == 1$ then
         $args = \{arg_1, arg_2, \ldots, arg_{k_2}\} = \text{Sample-2-Argument}(T_0)$
      end if
   else if $op$ is count then
      $args = \{count_1, count_2, \ldots, count_{k_2}\} = \text{Count-Network}(\sum_j T_j)$
   else
      $args = \{arg_1, arg_2, \ldots, arg_{k_2}\} = \text{Sample-Arbitrary-Argument}(\sum_j T_j)$
   end if

354 $\{$
$probs = \{(p^{num} * p^{op} * p) | p \in p^{arg}\} \in \mathbb{R}^{k_2}$   // $p$'s refer to the corresponding probabilities
$answers = \{\text{Execute-Discrete-Operation}(type, op, arg) | arg \in args\} \in \mathbb{R}^{k_2}$
$actions = \{(prob, answer) | prob \in probs, answer \in answers\}$
$Actions = Actions \cup actions$
end for

Training:
355 $\{$
for $i \in \{1, \ldots, N_{IML} + N_{RL}\}$ do
   for $(x, y) \in D$ do
      $A(x) \leftarrow Actions$ sampled for input $x$   // Using above Algorithm
      $R(x, a, y) \leftarrow$ Exact Match Reward for action $a$ for instance $x$ with gold answer $y$
      if $i \leq N_{IML}$ then
         $(\theta, \phi) \leftarrow \max_{\theta, \phi} J^{IML} \text{ over } (A, R) + \min_\phi \mathcal{L}_{aux}$   $J^{IML}$ from Equation [2]
      else
         $(\theta, \phi) \leftarrow \max_{\theta, \phi} J^{RL} \text{ over } (A, R) + \min_\phi \mathcal{L}_{aux}$   $J^{RL}$ from Equation [3]
      end if
   end for
end for

| Module | Performance |
|---|---|
| Sample 1 Argument | 54% (Acc.) |
| Sample 2 Argument | 52% —"— |
| Counter | 50% —"— |
| Entity Ranker | 53% —"— |
| Operator Predictor | 78% —"— |
| Entity Type Predictor | 83% —"— |
| Overall Action Sampler | 84% (Rec@All) |

SYSTEMS AND METHODS FOR NUMERICAL REASONING BY A PARTIALLY SUPERVISED NUMERIC REASONING MODULE NETWORK

RELATED APPLICATIONS

This application claims priority to U.S. Provisional Patent Application No. 63/086,851, filed Oct. 2, 2020, which is entirely incorporated herein by reference for all purposes.

TECHNICAL FIELD

The present disclosure relates generally to machine learning models and neural networks, and more specifically, to using a partially supervised numeric reasoning module network for numerical reasoning over text with limited label data.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Neural Module Networks (NMNs) have been quite successful in incorporating explicit reasoning as learnable modules in various question answering tasks. However, to achieve this, contemporary NMNs typically need exhaustive supervision in executing the query as a specialized program over reasoning modules and fail to generalize to more open-ended settings without such supervision. Such supervision often requires a large amount of manual labor to annotate training samples, which can be both time-consuming and expensive.

Therefore, there is a need for an efficient mechanism for providing numerical reasoning in a question answering network with limited label data.

BRIEF DESCRIPTION OF THE DRAWINGS

FIG. 3B provides a pseudo-code segment providing additional implementation details of the process shown in FIG. 3A, according to some embodiments.

FIG. 4 provides example along with their Dependency Parse Tree, according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

As used herein, the term "partial," "partially" or "weakly" is used to refer to something that is to a limited extent. For example, partial supervision may be used to refer to a training scheme with only a certain type of labels, while absent another type of labels. Within embodiments described herein, the partially supervised module network may be trained with answers to an input query as the sole supervision.

Overview

Artificial intelligence, implemented with neural networks and deep learning models, can be used to implement a task-oriented dialogue. In task-oriented dialogue, a human user engages in a "conversation" or dialogue with an automated system or agent to achieve specific user goals in one or more task-oriented domains, such as, for example, find numeric answers for numeric reasoning-based inquiries.

End-to-end neural models have proven to be powerful tools for an expansive set of language and vision problems by effectively emulating the input-output behavior. However, many real problems like Question Answering (QA) or Dialog need more interpretable models that can incorporate explicit reasoning in the inference. The systems and methods described herein focus on the most generic form of numerical reasoning over text, encompassed by the reasoning-based machine reading comprehension (MRC) framework. A particularly challenging setting for this task is where the answers are numerical in nature as in the popular MRC dataset, DROP (D. Dua et al, "DROP: A reading comprehension benchmark requiring discrete reasoning over paragraphs," *Proceedings of the North American Chapter of the Association for Computational Linguistics* (2019), which is entirely incorporated herein by reference for all purposes).

The systems and method described herein generally utilize an approach referred to herein as weakly supervised neuro-symbolic module networks (WNSMNs). The WNSMNs may be trained with answers as their sole supervision for MRC. The WNSMNs may learn to execute a noisy heuristic program as discrete actions over neural and symbolic reasoning module. The noisy heuristic program may be obtained from dependency parsing of a query. The WNSMNs may further train the noisy heuristic program in an end-to-end fashion using a reinforcement learning (RL) framework. The RL framework may utilize a discrete reward based on answer matching.

Figure 1:
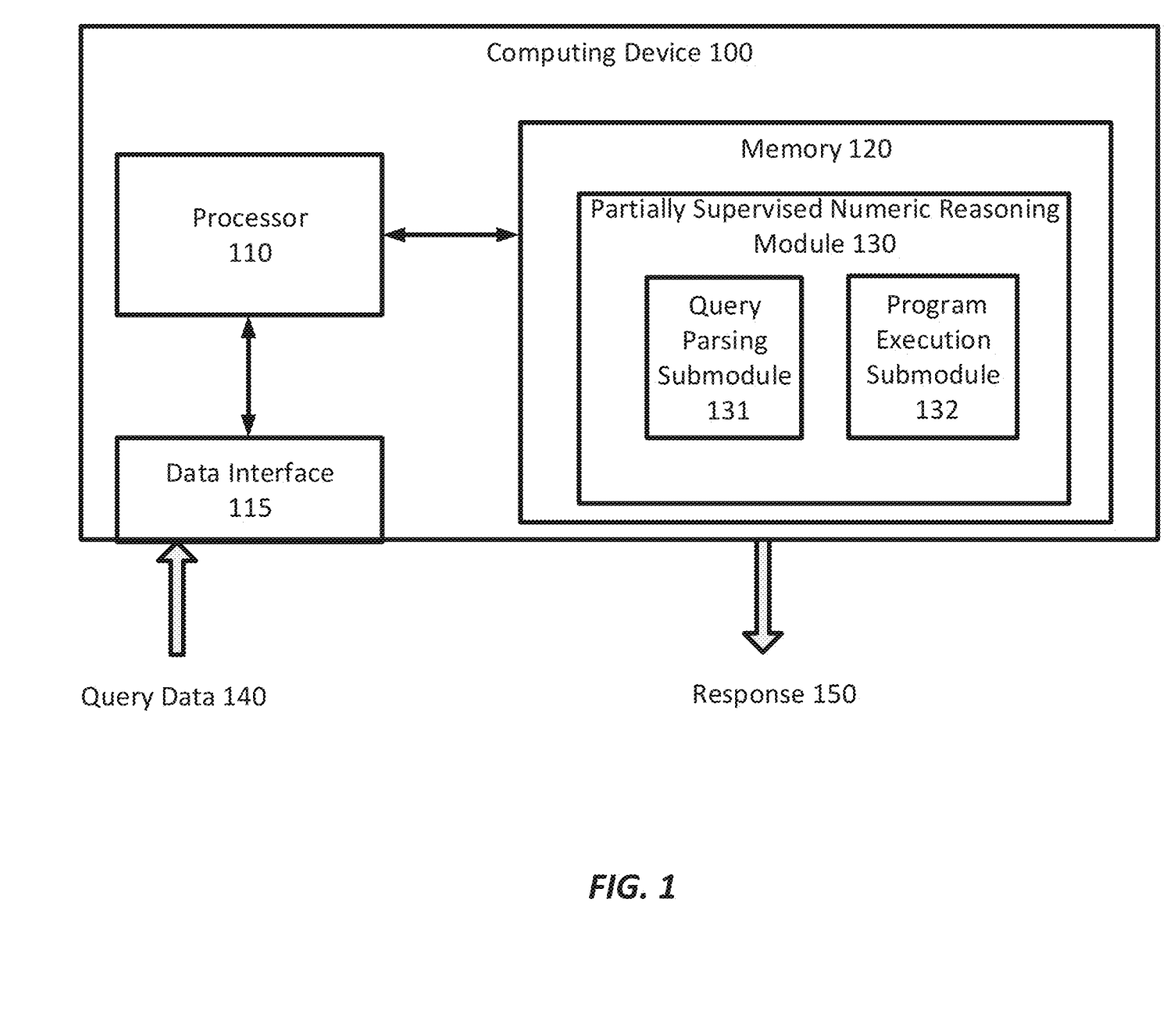
FIG. 1 is a simplified diagram of a computing device for implementing question answering using a partially supervised numeric reasoning module, according to some embodiments.

FIG. 1 is a simplified diagram of a computing device for implementing question answering using a partially supervised numeric reasoning module, according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some embodiments, memory 120 may include non-transitory, tangible, machine readable media that includes executable code that when run by one or more processors (e.g., processor 110) may cause the one or more processors to perform the methods described in further detail herein. For example, as shown, memory 120 includes instructions for a partially supervised numeric reasoning module 130 that may be used to implement and/or emulate the systems and models, and/or to implement any of the methods described further herein. In some examples, the partially supervised numeric reasoning module 130, may receive an input 140, e.g., such as query data like query-passage pairs, via a data interface 115. The data interface 115 may be any of a user interface that receives the user utterance, or a communication interface that may receive or retrieve a context history from the database. The partially supervised numeric reasoning module 130 may generate an output 150 such as a response. In some implementations, the output 150 may further include a numerical reasoning accompanying the response to the input query 140.

In some embodiments, the partially supervised numeric reasoning module 130 includes a query parsing submodule 131 and a program execution submodule 132. Specifically, the query parsing submodule 131 is configured to generate a program form of a query from the input query data 140. For example, Stanford dependency parser may be used to decompose the query into a generalized program. The query parsing submodule may be configured to implement process 320 described herein with respect to FIG. 3A.

In some embodiments, the program execution submodule 132 is configured to receive the program form of the input query 140 from the query parsing submodule 131, based on which the submodule 132 learns to execute the program to reach an answer to the query. For example, the program execution submodule 132 may execute the program over one or more passages. Specifically, in the preprocessing step, submodule 132 identifies numbers and dates from the passage, and maintains them as separate canonicalized entity-lists along with their mention locations. The submodule 132 may then learn an entity-specific cross-attention model to rank the entities with respect to their query-relevance. In doing so, the submodule 132 may be configured to implement process 330 described herein with respect to FIG. 3A. The submodule 132 then learns to sample the correct entities as discrete arguments and executes appropriate discrete operations on them to reach the answer. In doing so, the submodule 132 may be configured to implement process 340 described herein with respect to FIG. 3A.

Figure 3A:
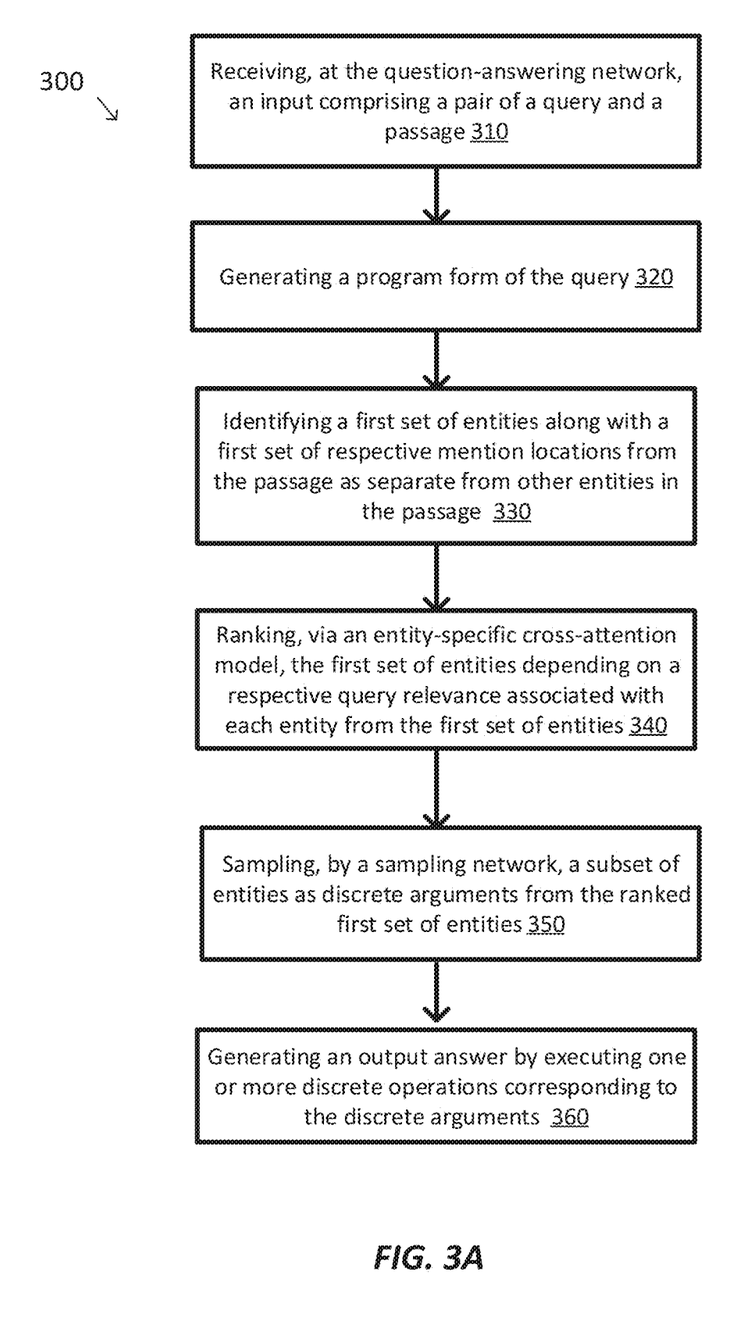
FIG. 3A is a simplified logic flow diagram illustrating a method that implements the submodules in FIG. 1, according to some embodiments.

In some embodiments, a reinforcement learning (RL) framework may be adopted to train module 130 end-to-end with the answer/response 150 as the sole supervision, as described herein with respect to processes 350 and 360 described herein with respect to FIG. 3A.

In some examples, the partially supervised numeric reasoning module 130 and the sub-modules 131-132 may be implemented using hardware, software, and/or a combination of hardware and software.

Figure 2:
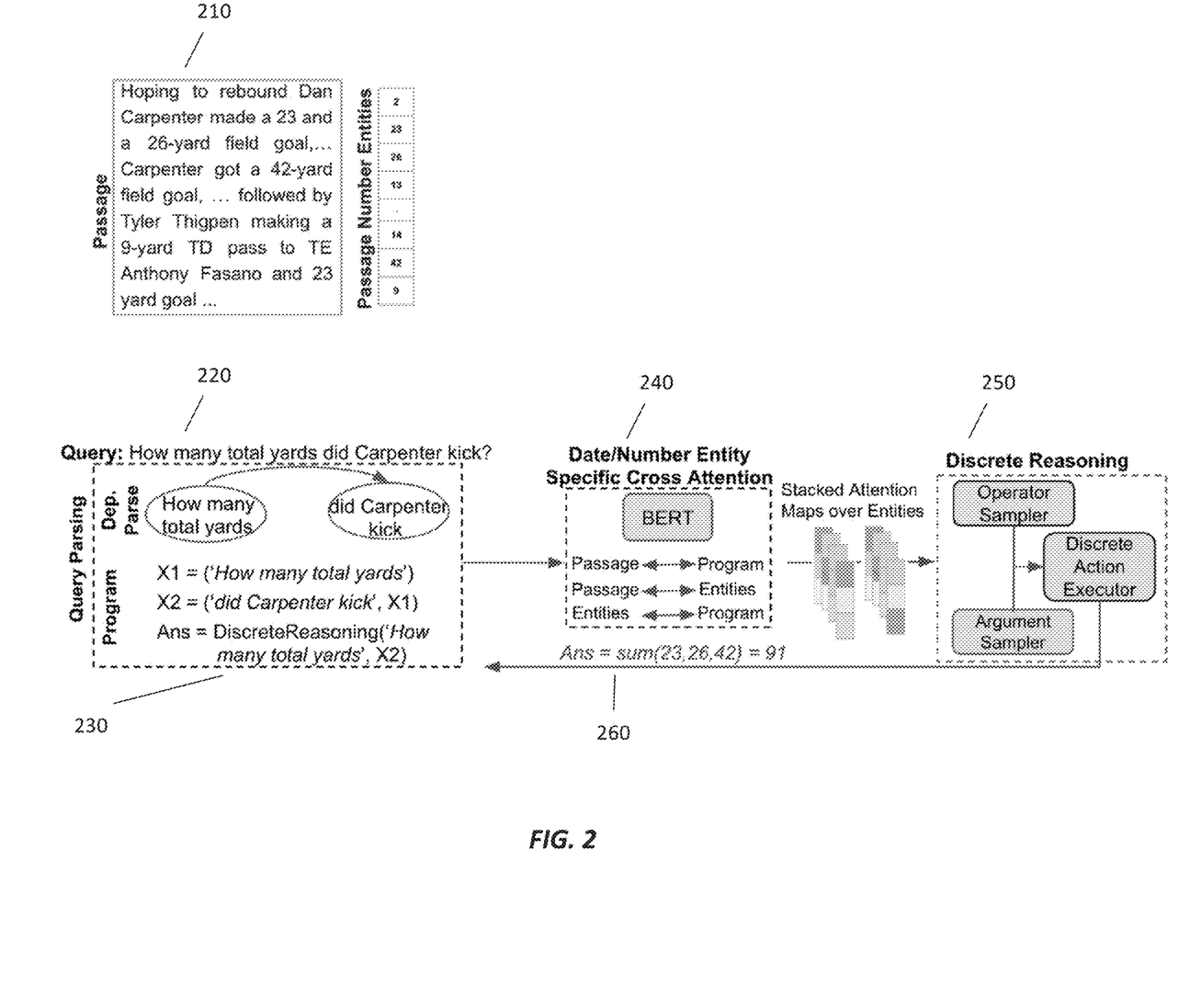
FIG. 2 is a block diagram illustrating an example architecture of using a partially supervised numeric reasoning model that implements the submodules in FIG. 1, according to some embodiments.

FIG. 2 is a diagram illustrating an example architecture of implementing the partially supervised numeric reasoning model 130 including the submodules 131-132 in FIG. 1, according to some embodiments. Specifically, a partially supervised numeric reasoning module 130 engages the sub-module 131 to parse a non-limiting exemplary query 220 "How many total yards did Carpenter kick?" into programs 230: X1=('how many total yards'); X2=('did Carpenter kick', X1); Answer=Discrete-Reasoning ('how many total yards', X2). The partially supervised numeric reasoning module 130 uses the submodule 132 to execute the programs obtained from parsing of queries over the passage 210 to rank query-relevant entities, such as dates and number entities identified from the passage 210. The partially supervised numeric reasoning module 130 ranks the query-relevant entities by learning a date and number entity specific across attention model 240.

The partially supervised numeric reasoning module 130 further engages the submodule 132 to execute a model of discrete reasoning 250 based on the final program step. The discrete reasoning model 250 samples the correct entities as discrete arguments to execute appropriate discrete operations on these entity arguments to reach an answer 260, such as a numeric answer. An RL framework trains the discrete learning module 250 end-to-end with the answer 260 as partial supervision, as described herein with respect to processes 350 and 360 described herein with respect to FIG. 3A.

FIG. 3A is a simplified logic flow diagram illustrating a method that implements the submodules in FIG. 1, and FIG. 3B provides a pseudo-code segment providing additional implementation details of the process shown in FIG. 3A, according to some embodiments. One or more of the processes 310-360 of method 300 may be implemented, at least in part, in the form of executable code stored on non-transitory, tangible, machine-readable media that when run by one or more processors may cause the one or more processors to perform one or more of the processes 310-360. In some embodiments, method 300 may correspond to the method used by the module 130.

At process 310, an input comprising query data such as a pair of a query and a passage may be received at a question-answering (QA) network. The QA network may comprise a data interface 115 described herein with respect in FIG. 1. In some embodiments, the query data includes a passage 210 and a query 220 described herein with respect to FIG. 2.

At process 320, a program form of the query may be generated, e.g., by parsing a dependency structure indicating a relationship among entities in the query. For example, to build a dependency structure, first, a node may be constructed for the subtree rooted at each child of the root by merging its descendants in the original word order. Second, an edge may be added from the left-most node (which may be referred to as the root clause) to every other node. Third, by traversing left to right, each node may be organized into a step of a program having a linear flow. For example, the program obtained in FIG. 2 may be X1=('which is the longest'); X2=('goal by Carpenter', X1); Answer=Discrete-Reasoning('which is the longest', X2). Each program step may consist of two types of arguments: (i) Query Span Argument obtained from the corresponding node, may indicate the query segment referred to, in that program step e.g., 'goal by Carpenter' in Step 2; and (ii) Reference Argument(s) obtained from the incoming edges to that node, may refer to the previous steps of the program that the current one depends on.

Next, a final step of the program may be added. This final step may have the reference argument as the leaf node(s) obtained in the above manner and the query span argument as the root-clause. This step may be specifically responsible for handling the discrete operation, enabled by the root-clause which may be indicative of the kind of discrete reasoning involved (e.g., max). Since this is a noisy heuristic, the QA model may be robust to such noise and may additionally rely on the full query representation in order to predict the discrete operation. For simplicity, the number of reference arguments is limited to 2 herein. However, the method may utilize any number of reference arguments. Examples of dependency parse trees and obtained programs for WNSMN are further described in relation to FIG. 4.

At process 330, a first set of numerical entities along with a first set of respective mention locations may be identified from the passage as separate from other entities in the passage. Identifying the first set of numerical entities may comprise decomposing the query based on generic text parsing. For example, as a preprocessing step shown at 351 in FIG. 3B, the WNSMN identifies numbers and dates from the passage, and the identified numerical entities are maintained as separate canonicalized entity-lists along with their mention locations.

At process 340, the first set of numerical entities may be ranked, via an entity-specific cross-attention model, depending on a respective query relevance associated with each entity from the first set. To rank the query-relevant passage entities, the interaction between program and passage is modeled. The entity-specific cross-attention model may be configured to extract passage information relevant to each step of a decomposed query and generate passage-to-number and passage-to-date attentions, as shown at 352 in FIG. 3B. Additional details of the entity-specific cross-attention model are described below in relation to FIG. 5.

At process 350, a subset of entities as discrete arguments from the ranked first set of entities may be sampled by a sampling network. Process 350 may be implemented by the operations 353 in FIG. 3B with a sampling network illustrated in FIG. 6.

At process 360, an output answer may be generated by executing one or more discrete operations corresponding to the discrete arguments, e.g., at 354 in FIG. 3B. The output answer may be generated by leveraging a combination of neural and discrete modules. For example, the model may execute a single step of discrete reasoning based on the final program step. The final step may contain (i) root-clause of the query which may indicate the type of discrete operation (e.g., 'what is the longest' indicates max, 'how many goals' indicates count), and (ii) reference argument indicating the previous program steps the final step depends on. Each previous step k may be represented as stacked attention maps $T_k^{num}$ and $T_k^{date}$, which are defined in relation to FIG. 5.

In one embodiment, the output answer may be used to supervised end-to-end training of the model within a reinforcement learning framework, e.g., at 355 in FIG. 3B. The RL framework is further described in relation to FIG. 6.

FIG. 4 provides some example queries similar to those in DROP along with their Dependency Parse Tree and the Simplified Representation obtained by constructing the nodes and edges as described herein, and the final program which is used by WNSMN. Note that in this simplified representation of the parse, tree the root-word of the original parse tree is absorbed in its immediate succeeding child. The structure is simplified in order to limit the number of reference arguments in any step of the program to 2, which in turn limits the number of terminal nodes to 2. This may be done in left to right traversal by collapsing any additional terminal node into a single node.

Figure 5:
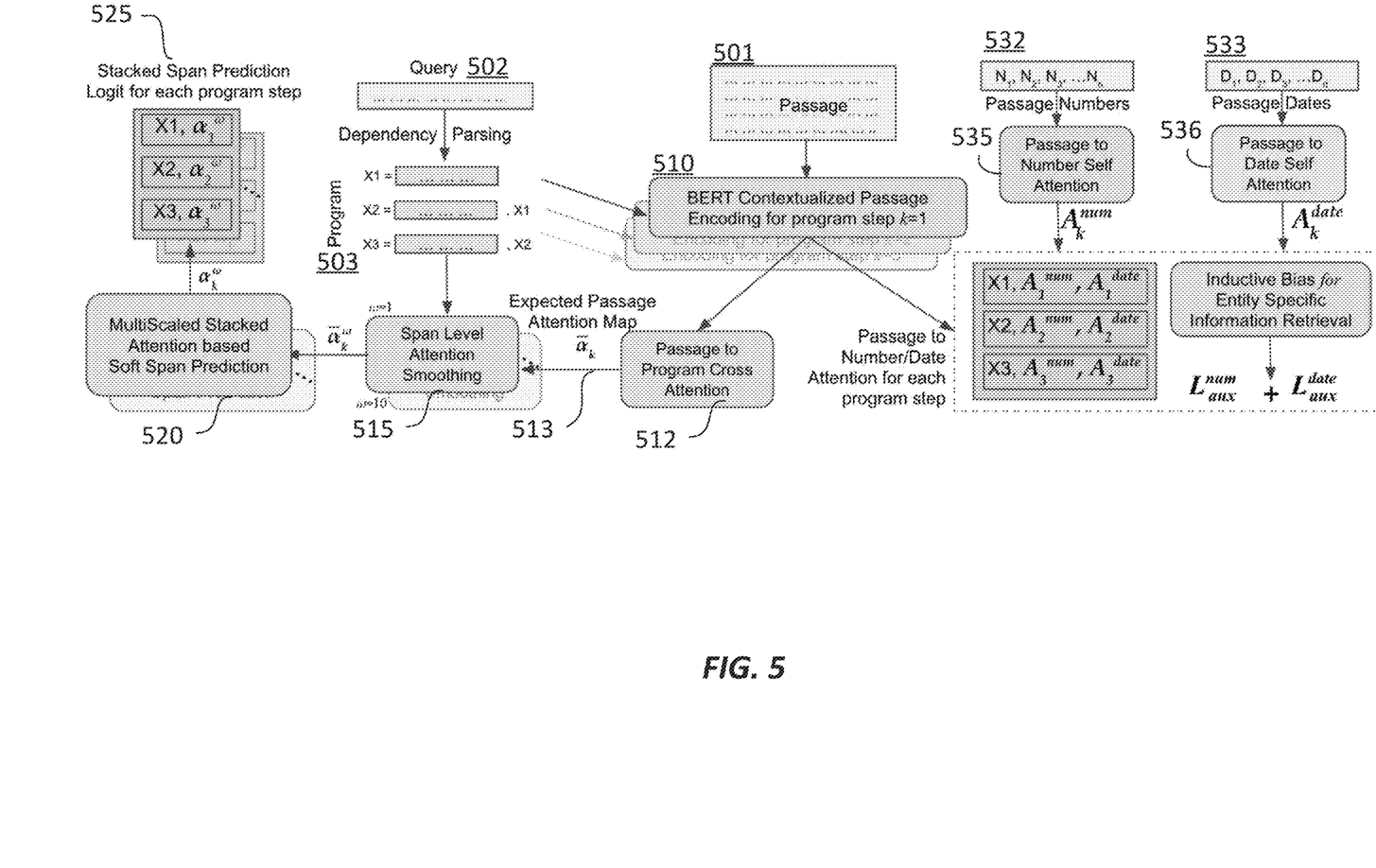
FIG. 5 provides an example structure illustrating an entity-specific cross-attention model for information extraction for ranking the query-relevant passage entities, according to embodiments described herein.

FIG. 5 provides an example structure illustrating an entity-specific cross-attention model for information extraction for ranking the query-relevant passage entities at process 340 in FIG. 3A, according to embodiments described herein.

Given an input passage 501, a BERT-based pretrained encoder (J. Devlin et al, "Bert: Pre-training of deep bidirectional transformers for language understanding," arXiv: 1810.04805 (2018), which is entirely incorporated herein by reference for all purposes) may be used to get contextualized token embeddings of the passage 501 and query span argument of each program step, respectively denoted by $P_k$ and $Q_k$ for the k'th program step. Meanwhile, the program 503 may be generated via dependency parsing from query 502.

Based on this, a similarity matrix $S \in \mathbb{R}^{l \times n \times m}$ between the program 503 and passage 501 may be learned, where l, n, and m are the program length, query span argument, and passage length (in tokens), respectively. Each $S_k \in \mathbb{R}^{n \times m}$ may represent the affinity over the passage tokens for the k'th program argument and may be defined as $S_k(i,j) = \omega^T[Q_{ki}; P_{kj}; Q_{ki} \odot P_{kj}]$. Here, w is a learnable parameter and $\odot$ represents element-wise multiplication.

The passage to program cross attention module 512 may compute an attention map $A_k$ over the passage tokens for the k'th program argument as $$A_k(i, j) = \text{softmax}_j(S_k(i, j)) = \frac{\exp(S_k(i, j))}{\sum_j \exp(S_k(i, j))}.$$

Similarly, for the i'th token of the k'th program argument the cumulative attention $a_{ki}$ with respect to the passage may be given by $a_{ki} = \text{softmax}_i(\Sigma_j S_k(i,j))$. A linear combination of the attention map $A_k(i,\bullet)$ weighted by $a_{ki}$ may give the expected passage attention 513 for the k'th step, $\bar{\alpha}_k = \Sigma_i a_{ki} A_k(i,\bullet) \in \mathbb{R}^m$.

To facilitate information spotting and extraction over contiguous spans of text, the expected passage attention 513 may be regularized so that the attention on a passage token is high if the attention over its neighbors is so. The span level attention smoothing module 515 adopts a heuristic smoothing technique (T. Huang et al, "A window-based self-attention approach for sentence encoding," *Neurocomputing* 375, 25-31 (2020), which is entirely incorporated herein by reference for all purposes), taking a sliding window of different lengths $\omega = \{1, 2, \ldots 10\}$ over the passage, and replacing the token-level attention with the attention averaged over the window. This may result in 10 different attention maps over the passage for the k'th step of the program: $\{\bar{\alpha}_k^\omega | \omega \in \{1, 2, \ldots 10\}\}$.

A multi-scaled version of $\bar{\alpha}_k^\omega$ may be taken by multiplying the attention map with |s| different scaling factors (s=\{1,2,5,10\}), yielding a |s|-dimensional representation for each passage token, i.e., $\bar{\alpha}_k^\omega \in \mathbb{R}^{m \times |s|}$.

The output $\bar{\alpha}_k^w$ may then be passed to the multi-scaled stacked attention based soft span prediction module 520, which may take a form of t a L-layered stacked self-attention transformer block to encode $\bar{\alpha}_k^w$ to an m×d dimension, followed by a linear layer of dimension d×1, to obtain the span prediction logits: $\alpha_k^\omega = \text{Linear}(\text{Transformer}(\text{MultiScaling}(\bar{\alpha}_k^\omega)) \in \mathbb{R}^m$. The span predictive logits 525 at each program step (say k) may be additively combined with those from the previous steps referenced in the current one, through the reference argument (ref (k)) at step k, i.e., $\alpha_k^\omega = \alpha_k^\omega + \Sigma_{k' \in ref(k)} \alpha_{k'}^\omega$.

On the other hand, the entity-specific cross-attention model learns the interaction between program and number/date entities. That is, given a passage mention of a number/date entity 532 and/or 533 relevant to the query 502, the model may be able to attend to the neighborhood around it. To do this, for each program step, the passage to number self attention module 535 generates a passage tokens to number tokens attention map $A^{num} \in \mathbb{R}^{l \times m \times N}$, where N is the number of unique number entities. Note that this attention map may different for each program step as the contextual BERT encoding 510 of the passage tokens ($P_k$) may be coupled with the program's span argument of that step. At the k-th step, the row $A_k^{num}(i,\bullet)$ denotes the probability distribution over the N unique number tokens w.r.t. the i-th passage token. The attention maps may be obtained by a softmax normalization of each row of the corresponding passage tokens to number tokens similarity matrix, $S_k^{num} \in \mathbb{R}^{m \times N}$ for k=\{1 \ldots l\}, where the elements of $S_k^{num}$ may be computed as $S_k^{num}(i,j) = P_{ki}^T W_n P_{kn_j}$, $W_n \in \mathbb{R}^{d \times d}$ may be a learnable projection matrix and $n_j$ may be the passage location of the j-th number token. These similarity scores may be additively aggregated over all mentions of the same number entity of the passage.

The relation between program 503 and entities 532 may then be modeled as $\tau_k^\omega = \text{softmax}(\Sigma_i \alpha_{ki}^\omega A_k^{num}(i,\bullet)) \in \mathbb{R}^N$, which may give the expected distribution over the N number tokens for the k-th program step and using $\omega$ as the smoothing window size. The final stacked attention map obtained for the different windows may be $T_k^{num} = \{\tau_k^\omega | \omega \in \{1, 2, \ldots 10\}\}$. Similarly, for each program step k, a separate stacked attention map $T_k^{date}$ may be computed over the unique date entities 533 by a passage to date self attention module 536, parameterized by a different $W_d$. To obtain a meaningful attention over entities, information extraction capability may be incorporated in the number and date attention maps $A^{num}$ and $A^{date}$, by enabling the model to attend over the neighborhood of the relevant entity mentions.

An unsupervised auxiliary losses and $\mathcal{L}_{aux}^{num}$ and $\mathcal{L}_{aux}^{date}$ may then computed as the training objective, which may impose an inductive bias over the number and date entities:

$$\mathcal{L}_{aux}^{num} = \tag{1}$$

$$-\frac{1}{l}\sum_{k=1}^{l}\left[\sum_{i=1}^{m}\left[\log\left(\sum_{j=1}^{N}\mathbb{1}_{n_j \in [i \pm \Omega]} a_{kij}^{num}\right) - \sum_{j=1}^{N}\mathbb{1}_{n_j \notin [i \pm \Omega]} a_{kij}^{num} \log(a_{kij}^{num})\right]\right]$$

Here, $\mathbb{1}$ is indicator function and $a_{kij}^{num} = A_k^{num}(i,j)$. $\mathcal{L}_{aux}^{date}$ for date entities is similarly defined.

Figure 6:
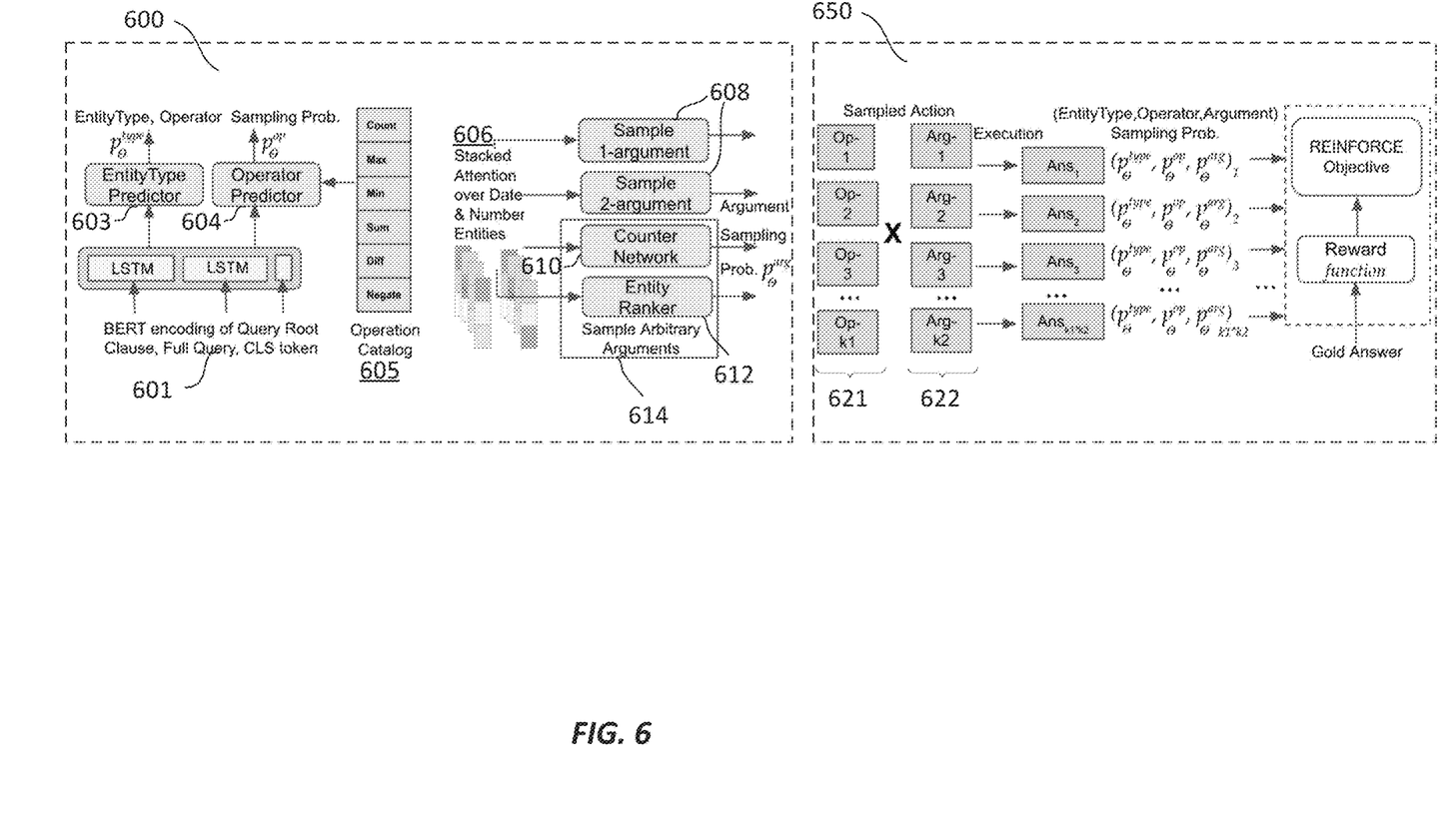
FIG. 6 provides a simplified diagram illustrating an operator and argument sampling network and RL framework over sampled discrete actions, according to one embodiment described herein.

Minimizing a loss objective of $\mathcal{L}_{aux}^{num} + \mathcal{L}_{aux}^{date}$ may ensure that the passage attention is densely distributed inside the neighborhood of $\pm\Omega$ (a hyperparameter, e.g., 10) of the passage location of the entity mention, without imposing any bias on the attention distribution outside the neighborhood. Consequently, this may maximize the log-form of cumulative likelihood of the attention distribution inside the window and the entropy of the attention distribution outside of it:

FIG. 6 provides a simplified diagram illustrating an operator and argument sampling network 600 and RL framework 650 over sampled discrete actions, according to one embodiment described herein.

The sampling network 610 may take as input 601: (i) BERT's [CLS] representation for the passage-query pair and LSTM of the BERT contextual representation of (ii) the root-clause from the final program step and (iii) full query (w.r.t. passage), to make two predictions.

The first predictor 603 may be an Entity-Type Predictor Network, an Exponential Linear Unit (Elu) activated fully-connected layer followed by a softmax that outputs the probabilities of sampling either date or number types. The second predictor 604 may be an Operator Predictor Network, a similar Elu-activated fully connected layer followed by a softmax which learns a probability distribution over a fixed catalog of 6 numerical and logical operations (count, max, min, sum, diff, negate), each represented with learnable embeddings.

Apart from the diff operator which may act only on two arguments, all other operations can take any arbitrary number of arguments. For example, as shown at the operation catalog 605, some of these operations can be applied only on numbers (e.g., sum, negate) while others can be applied on both numbers or date (e.g., max, count).

The sampling network 610 may learn to sample date/number entities as arguments for the sampled discrete operation, given the entity-specific stacked attentions 606 ($T_k^{num}$ and $T_k^{date}$) for each previous step k, that appears in the reference argument of the final program step. In order to allow sampling of fixed or arbitrary number of arguments, the argument sampler may learn four types of networks, each modeled with a L-layered stacked self attention based Transformer block (with output dimension d) followed by different non-linear layers embodying their functionality and a softmax normalization to get the corresponding probability of the argument sampling.

For example, the Sample $n \in \{1,2\}$ Argument Module 608 computes softmax(Elu(Linear$_{d \times n}$(Transformer(T)))), to output a distribution over the single entities (n=1) or a joint distribution over the entity-pairs (n=2). The counter module 610 computes softmaxElu((Linear$_{d \times 10}$(CNN–Encoder (Transformer(T)))), to predict a distribution over possible count values ($\in [1, \ldots, 10]$) of number of entity arguments to sample. The Entity-Ranker Module 612 computes softmax (PRelu(Linear$_{d \times 1}$(Transformer(T)))), and learns to re-rank the entities and outputs a distribution over all the entities given the stacked attention maps as input. A Sample Arbitrary Argument operation 614 is applied to the output of the counter network 610 and entity ranker 612: Multinomial (Entity-Ranked Distribution, Counter Prediction).

Depending on the number of arguments needed by the discrete operation and the number of reference arguments in the final program step, the sampling network 610 may invoke one of Sample $\{1, 2, \text{Arbitrary}\}$ Argument operations. For instance, if the sampled operator is diff, which needs 2 arguments, and the final step has 1 or 2 reference arguments, then the sampling network may respectively invoke either Sample 2 argument or Sample 1 argument on the stacked attention T corresponding to each reference argument. For operations needing arbitrary number of arguments, the sampling network 600 may invoke the Sampling Arbitrary Argument. For the Arbitrary Argument case, the sampling network 600 may first predict the number of entities $c \in \{1, \ldots, 10\}$ to sample using the Counter Network 610, and then sample from the multinomial distribution based on the joint of c-combinations of entities constructed from the output distribution of the Entity Ranker module 612.

In one embodiment, the model may be trained with partial supervision in a Reinforcement learning (RL) framework 650. the model may be trained with only discrete binary feedback from the exact match of the gold and predicted numerical answer. In some embodiments, the REINFORCE policy gradient method may be used, where a stochastic policy comprising a sequence of actions is learned with the goal of maximizing the expected reward. The discrete operations 621 along with argument sampling 622 may constitute the action. Because of the assumption that a single step of discrete reasoning suffices for most questions in DROP, the RL framework may be further simplified to a contextual multi-arm bandit (MAB) problem with a 1-step MDP, i.e., the agent performs only one step action.

In the MAB framework, for an input x=(passage(p), query(q)), the context or environment state may modeled by $s_\phi(x)$ the entity specific cross attention between the (i) passage (ii) program-form of the query and (iii) extracted passage date/number entities. Given the state $s_\phi(x)$, the layout policy may then learn the query-specific inference layout, i.e., the discrete action sampling policy $P_\theta(a|s_\phi(x))$ for action $a \in A$. The action sampling probability may be a product of the probability of sampling entities from the appropriate entity type ($P_\theta^{type}$), probability of sampling the operator ($P_\theta^{op}$), and probability of sampling the entity argument(s) ($P_\theta^{arg}$) by number of arguments to sample. Therefore, with the learnable context representation $s_\phi(x)$ of input x, the end-to-end objective may be to jointly learn $\{\theta, \phi\}$ that maximizes the expected reward $R(x,a) \in \{-1, +1\}$ over the sampled actions (a), based on exact match with the gold answer.

To mitigate the learning instability in such sparse confounding reward settings, the model may be initialized with a simpler iterative hard-Expectation Maximization (EM) learning objective, called Iterative Maximal Likelihood (IML) (C. Liang et al, "Neural symbolic machines: Learning semantic parsers on freebase with weak supervision," *Proceedings of the 55th Annual Meeting of the Association for Computational Linguistics* (Volume 1: Long Papers), pp. 23-33 (2017), which is entirely incorporated herein by reference for all purposes). With the assumption that the sampled actions are extensive enough to contain the gold answer, IML may greedily search for the good actions by fixing the policy parameters, and then maximize the likelihood of the best action that led to the highest reward. Good actions ($A^{good}$) may be those that result in the gold answer itself. A conservative approach of defining best among them may be simply the most likely one according to the current policy.

$$J^{IML}(\theta,\phi) = \Sigma_x \Sigma_{a \in A^{good^{max}}} \log P_{\theta,\phi}(a|x)$$

After the IML initialization, REINFORCE may be used as the learning objective after a few epochs, where the goal is to maximize the expected reward $J^{RL}(\theta,\phi) = \Sigma_x \mathbb{E}_{p_{\theta,\phi}(a|x)} R(x, a)$ as:

$$\nabla_{(\theta,\phi)} J^{RL} = \Sigma_x \Sigma_{a \in A} P_{\theta,\phi}(a|x) R(x,a) - B(x)) \nabla_{\theta,\phi}(\log P_{\theta,\phi}(a|x))$$

Here, B(x) is simply the average (baseline) reward obtained by the policy for that instance x. Further, in order to mitigate overfitting, in addition to $L_2$-regularization and dropout, entropy based regularization over the argument sampling distribution may also be added in each of the sampling networks.

Some examples of computing devices, such as computing device 100 described herein with respect to FIG. 1 may include non-transitory, tangible, machine readable media that include executable code that when run by one or more processors (e.g., processor 110) may cause the one or more processors to perform the processes of method 300. Some common forms of machine readable media that may include the processes of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Examples

The exact-match performance of WNSMN was compared with SoTA baselines on versions of DROP dataset and strong supervised skylines. The Primary Baselines for WNSMN were the explicit reasoning based NMN which uses additional strong supervision and the BERT based language model GenBERT (M. Geva et al, "Injecting numerical reasoning skills into language models," *Proceedings of the 58th Annual Meeting of the Association for Computational Linguistics* (2020), doi: 10.18653/v/1/2020.acl-main.89, which is entirely incorporated herein by reference for all purposes) that does not embody any reasoning and autoregressively generates numeric answer tokens. DROP-num, the subset of DROP with numerical answers, was used as the Primary Dataset. This subset contained 45 K and 5.8 K instances respectively from the standard DROP training and development sets. Originally, NMN was showcased on a very specific subset of DROP, restricted to the 6 reasoning-types it could handle, out of which three (count, date-difference, extract-number) had numeric answers. This subset comprised 20 K training and 1.8 K development instances, out of which only 10 K and 800 instances respectively had numerical answers. This numerical subset is referred to as DROP-Pruned-num. In both the cases, the training data was randomly split into 70%:30% for train and internal validation and the standard DROP development set was treated as the Test set.

Figure 7:
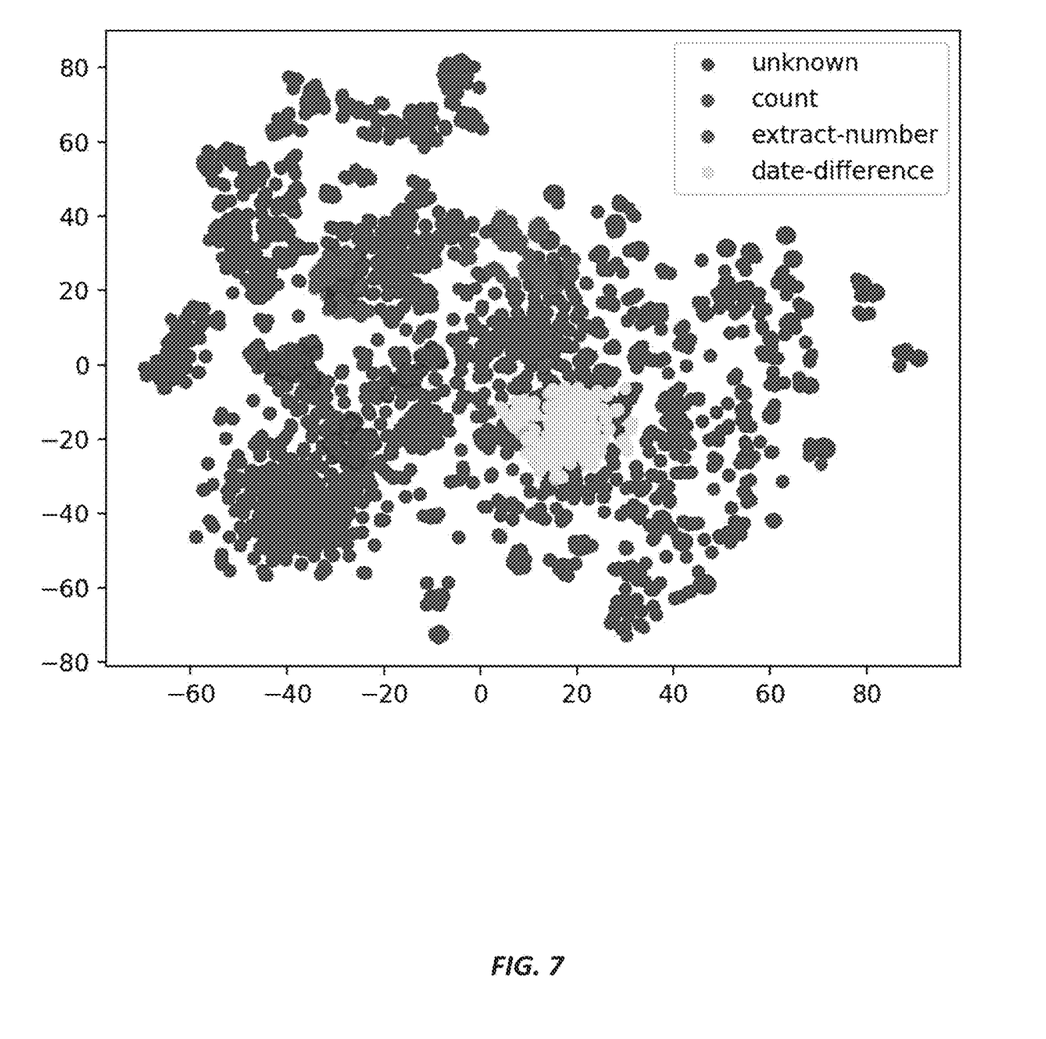
FIG. 7 shows a t SNE plot of pretrained Sentence-BERT, according to some embodiments.

FIG. 7 shows a t SNE plot of pretrained Sentence-BERT (N. Reimers and I. Gurevych, "Sentence-bert: Sentence embeddings using Siamese bert-network," *Proceedings of the* 2019 *Conference on Empirical Methods in Natural Language Processing*, 11 (2019), which is entirely incorporated herein by reference for all purposes) encoding of all questions in DROP-num-Test and also the DROP-Pruned-num-Test subset with different colors (red, green, yellow) representing different types. Not only are the DROP-num questions more diverse than the carefully chosen DROP-Pruned-num subset, the latter also forms well-separated clusters corresponding to the three reasoning types. Additionally, the average perplexity (using nltk) of the DROP-Pruned-num and DROP-num questions was found to be 3.9 and 10.65 respectively, further indicating the comparatively open-ended nature of the former.

For the primary baselines NMN and GenBERT, the performance on in-house trained models on the respective datasets is reported, using the code open-sourced by the authors. The remaining results refer to models trained on the full DROP dataset. All models used the same pretrained BERT-base. Also note that a primary requirement of all models other than GenBERT and WNSMN i.e., for NMN, MTMSN, NABERT, NAQANET, NumNet, was the exhaustive enumeration of the output space of all possible discrete operations. This simplified the QA task to a classification setting, thus alleviating the need for discrete reasoning in the inference process.

NMN's performance was abysmally poor, indeed a drastic degradation in comparison to its performance on the pruned DROP subset and the experiments in Table 2. This can be attributed to their limitation in handling more diverse classes of reasoning and open-ended queries in DROP-num, further exacerbated by the lack of one or more types of strong supervision. Earlier analysis on the complexity of the questions in the subset and full DROP-num further quantifies the relative difficulty level of the latter. On the other hand, GenBERT delivered a mediocre performance, while GenBERT-num degraded additionally by 4%, as learning from numerical answers alone further curbed the language modeling ability. The WNSMN models described herein performed significantly better than both these baselines, surpassing GenBERT by 8% and the NMN baseline by around 32%. This showcases the significance of incorporating explicit reasoning in neural models in comparison to the vanilla large scale LMs like GenBERT. It also establishes the generalizability of such reasoning based models to more open-ended forms of QA, in comparison to contemporary modular networks like NMN, owing to its ability to handle both learnable and discrete modules in an end-to-end manner.

TABLE 1

DROP-num Test Performance of Baselines and WNSMN

| Supervision Type | | | |
|---|---|---|---|
| Prog. | Exec. | QAtt. | Acc. (%) |
| NMN-num variants | | | |
| × | ✓ | ✓ | 11.77 |
| ✓ | × | ✓ | 17.52 |
| ✓ | ✓ | × | 18.27 |
| ✓ | × | × | 18.54 |
| × | ✓ | × | 12.27 |
| × | × | ✓ | 11.80 |
| × | × | × | 11.70 |
| GenBERT | | | |
| × | × | × | 42.30 |
| GenBert-num | | | |
| × | × | × | 38.41 |
| WNSMN | | | |
| × | × | × | 50.97 |

Table 2 shows a comparison of the performance of the proposed WNSMN with the same NMN variants (as in Table 1) on DROP-Pruned-num. Some of the salient observations are: (i) WNSMN in reached a performance quite close to the strongly supervised NMN variant (first row), and was able to attain at least an improvement margin of 4% over all other variants obtained by removing one or more types of supervision. This is despite all variants of NMN additionally enjoying the exhaustive precomputation of the output space of possible numerical answers; (ii) WNSMN suffered only in the case of extract-number type operations (e.g., max, min) that involve a more complex process of sampling arbitrary number of arguments; (iii) Performance drop of NMN was not very large when all or none of the strong supervision was present, possibly because of the limited diversity over reasoning types and query language; and (iv) Query-Attention supervision adversely affected NMN's performance, in absence of the program and execution supervision or both, possibly owing to an undesirable biasing effect. However when both supervisions were available, query-attention was able to improve the model performance by 5%. Test set of 800 instances may have been too small to get an unbiased reflection of the model's performances.

TABLE 2

DROP-Pruned-num-Test Performance of NMR variants and WNSMN

| Supervision-Type | | | | | Extract- | Date- |
|---|---|---|---|---|---|---|
| Prog. | Exec. | QAtt. | Acc. (%) | Count | num | differ |
| NMN-num Variants | | | | | | |
| ✓ | ✓ | ✓ | 68.6 | 50.0 | 88.4 | 72.5 |
| x | ✓ | ✓ | 42.4 | 24.1 | 73.9 | 36.4 |
| ✓ | x | ✓ | 54.3 | 47.9 | 80.7 | 40.9 |
| ✓ | ✓ | x | 63.3 | 45.5 | 81.1 | 68.7 |
| x | x | ✓ | 48.2 | 38.1 | 72.4 | 41.9 |
| ✓ | x | x | 61.0 | 44.7 | 81.1 | 63.2 |
| x | ✓ | x | 62.3 | 43.7 | 84.1 | 67.7 |
| x | x | x | 62.1 | 46.8 | 83.6 | 66.1 |
| WNSMN | | | | | | |
| x | x | x | 66.5 | 58.8 | 66.8 | 75.2 |

Table 3 shows recall over the top-k actions sampled by WNSMN to estimate how it compares to the strongly supervised skylines: (i) NMN with all forms of strong supervision; (ii) GenBERT variants +ND, +TD and +ND+TD further pretrained on synthetic Numerical and Textual Data and both; (iii), reasoning-free hybrid models like MTMSN (R. Hu et al, "Learning to reason: End-to-end module networks for visual question answering," *IEEE International Conference on Computer Vision*, pp. 804-813 (2017), doi: 10.1109/ICCV.2017.93, which is entirely incorporated herein by reference for all purposes) and NumNet (J. Ran et al, "NumNet: Machine reading comprehension with numerical reasoning," *Proceedings of the 2019 Conference on Empirical Methods in Natural Language Processing and the 9th International Joint Conference on Natural Language Processing*, pp. 2474-2484 (2019), doi: 10.18653/v1/D19-1251, which is entirely incorporated herein by reference for all purposes), NAQANet (D. Dua et al, "DROP: A reading comprehension benchmark requiring discrete reasoning over paragraphs," *Proceedings of the North American Chapter of the Association for Computational Linguistics* (2019), which is entirely incorporated herein by reference for all purposes) and NABERT, NABERT+ (J. Kinley and R. Lin, "Nabert+: Improving numerical reasoning in reading comprehension" (2019), which is entirely incorporated herein by reference for all purposes). Note that both NumNet and NAQANet did not use pretrained BERT. MTMSN achieved SoTA performance through a supervised framework of training specialized predictors for each reasoning type to predict the numerical expression directly instead of learning to reason. While top-1 performance of WNSMN (in Table 1) was 4% worse than NABERT, Recall@top-2 was equivalent to the strongly supervised NMN, top-5 and top-10 was comparable to NABERT+, NumNet and GenBERT models +ND, +TD and top-20 nearly achieved SoTA. Such promising recall over the top-k actions suggests that more sophisticated RL algorithms with better exploration strategies can possibly bridge this performance gap.

TABLE 3

Skylines and WNSMN top-k performance on DROP-num-Test

| Strongly Supervised Models | Acc. (%) |
|---|---|
| NMN-num (all supervision) | 58.10 |
| GenBERT + ND | 69.20 |
| GenBERT + TD | 70.50 |
| GenBERT + ND + TD | 75.20 |
| NAQANet | 44.97 |
| NABERT | 54.27 |
| NABERT+ | 66.60 |
| NumNet | 69.74 |
| MTMSN | 75.00 |

| Recall @ top-k actions of WNSMN (%) | | | | | |
|---|---|---|---|---|---|
| k = 2 | k = 3 | k = 4 | k = 5 | k = 10 | k = 20 |
| 58.6 | 63.0 | 65.4 | 67.4 | 72.3 | 74.2 |

Figure 8A:
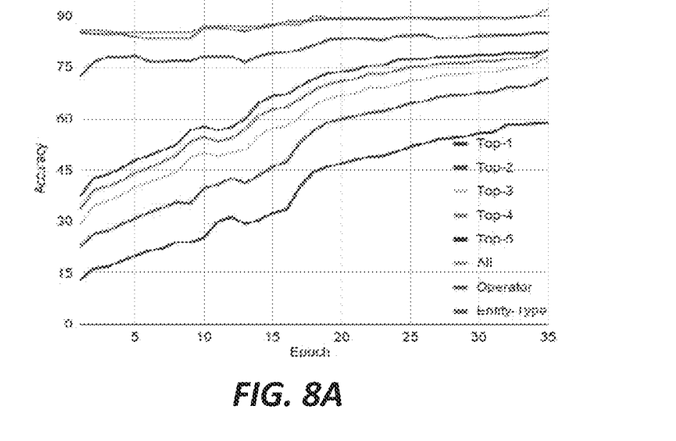
FIG. 8A shows a training trend, according to some embodiments.
Figure 8B:
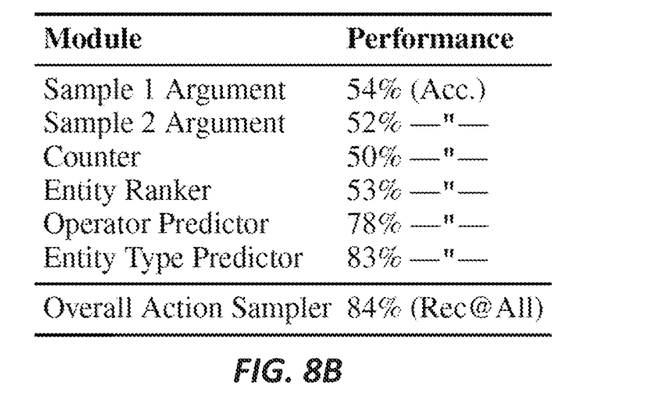
FIG. 8B shows module-wise performance on the DROP-num test, according to some embodiments.
Figure 8C:
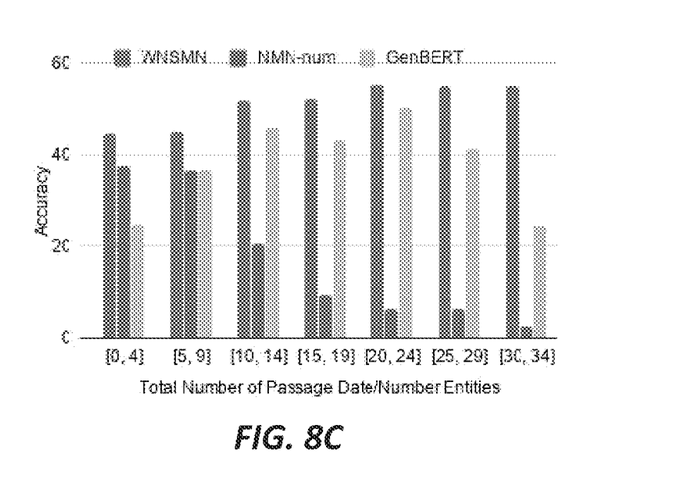
FIG. 8C shows bucketing performance by total number of passage entities, according to some embodiments.

Despite the notorious instabilities of RL due to high variance, the training trend, as shown in FIG. 8A, is not afflicted by catastrophic forgetting. The sudden performance jump between epochs 10-15 may be due to switching from iterative ML initialization to REINFORCE objective. FIG. 8B shows the individual module-wise performance evaluated using the noisy pseudo-rewards, that indicate whether the action sampled by this module led to the correct answer or not. Further, by bucketing the performance by the total number of passage entities in FIG. 8C, it is observed that WNSMN remained unimpacted by the increasing number of date/numbers, despite the action space explosion. On the other hand, GenBERT's performance dropped linearly beyond 25 passage entities and NMN-num degraded exponentially from the beginning, owing to its direct dependency on the exponentially growing exhaustively precomputed output space.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of an artificial intelligence (AI) agent deployed on a computing device to conduct a dialogue with a user, the method comprising:
   receiving, at a question-answering neural network comprising an entity-specific cross-attention model and a sampling network implemented on one or more processors, an input comprising a pair of a query and a passage, wherein the query includes a set of words in an original word order;
   generating a dependency parse tree of the query including at least a root and immediate children of the root;
   generating a simplified parse tree including:
   a plurality of nodes, wherein each node of the plurality of nodes includes all words from a respective subtree rooted at each of the immediate children of the root of the dependency parse tree in the original word order of the query, and
   a plurality of edges between a first node of the plurality of nodes and each other node of the plurality of nodes;
   generating a program form of the query with at least a step of the program form for each of the plurality of edges of the simplified parse tree;
   identifying a first set of numerical entities along with a first set of respective mention locations from the passage as separate from other entities in the passage;
   ranking, via the entity-specific cross-attention model, the first set of numerical entities depending on a respective query relevance associated with each numerical entity from the first set of numerical entities based on an interaction between the passage and a respective step of the program form;
   sampling, by the sampling network, a subset of numerical entities as discrete arguments from the ranked first set of numerical entities;
   executing one or more discrete operations corresponding to the discrete arguments to provide an output answer to the query; and
   generating, via a user interface of the AI agent, an output based on the output answer to the query by executing one or more discrete operations corresponding to the discrete arguments.

2. The method of claim 1, wherein the identifying the first set of numerical entities comprises:
   decomposing the query based on generic text parsing;
   identifying numbers and dates from the passage; and
   maintaining the identified first set of numerical entities as a separate canonicalized entity list.

3. The method of claim 1, wherein the entity-specific cross-attention model is configured to generate a span prediction logit indicative of the interaction between the passage and the respective step of the program form.

4. The method of claim 3, wherein the span prediction logit is generated by:
   generating, from contextualized passage encodings, a passage to program attention;
   generating, via span level attention smoothing, an expected passage attention from the passage to program attention at the respective step of the program form; and
   generating the span prediction logit by multi-scaled stacked attention based soft span prediction.

5. The method of claim 1, wherein the first set of numerical entities includes numbers and dates in the passage, and the method further comprises:
   generating a passage-to-number and/or a passage-to-date attention at each step of the program form; and
   generating a loss objective taking a log-form of cumulative likelihood of attention distribution of the passage-to-number and/or a passage-to-date attention.

6. The method of claim 1, wherein the subset of numerical entities are sampled as discrete arguments given entity-specific stacked attentions.

7. The method of claim 1, wherein the generating the output answer by executing one or more discrete operations comprises leveraging a combination of neural and discrete modules.

8. The method of claim 5, further comprising:
   training the question-answering neural network using the output answer as supervision in a reinforcement learning (RL) framework.

9. The method of claim 8, wherein the RL framework used for end-to-end training of the question-answering neural network is a contextual multi-arm bandit form with a 1-step Markov Decision Process.

10. The method of claim 8, further comprising:
    updating parameters of the question-answering neural network by maximizing an expected reward and minimizing the loss objective.

11. A system for providing numerical reasoning in a question-answering neural network to conduct a dialogue with a user, comprising:
    a non-transitory memory; and
    one or more processors coupled to the non-transitory memory and configured to read instructions from the non-transitory memory to cause the system to perform operations comprising:
    receiving, at the question-answering neural network comprising an entity-specific cross-attention model and a sampling network implemented on one or more processors, an input comprising a pair of a query and a passage, wherein the query includes a set of words in an original word order;
    generating a dependency parse tree of the query including at least a root and immediate children of the root;
    generating a simplified parse tree including:
    a plurality of nodes, wherein each node of the plurality of nodes includes all words from a respective subtree rooted at each of the immediate children of the root of the dependency parse tree in the original word order of the query, and
    a plurality of edges between a first node of the plurality of nodes and each other node of the plurality of nodes;
    generating a program form of the query with at least a step of the program form for each of the plurality of edges of the simplified parse tree;
    identifying a first set of numerical entities along with a first set of respective mention locations from the passage as separate from other entities in the passage;
    ranking, via the entity-specific cross-attention model, the first set of numerical entities depending on a respective query relevance associated with each numerical entity from the first set of numerical entities based on an interaction between the passage and a respective step of the program form;
    sampling, by the sampling network, a subset of numerical entities as discrete arguments from the ranked first set of numerical entities;
    executing one or more discrete operations corresponding to the discrete arguments to provide an output answer to the query; and generating, via a user interface of an artificial intelligence (AI) agent, an output based on the output answer to the query by executing one or more discrete operations corresponding to the discrete arguments.

12. The system of claim 11, wherein the identifying the first set of numerical entities comprises decomposing the query based on generic text parsing.

13. The system of claim 11, wherein the entity-specific cross-attention model is configured to generate a span prediction logit indicative of the interaction between the passage and the respective step of the program form.

14. The system of claim 13, wherein the span prediction logit is generated by:
generating, from contextualized passage encodings, a passage to program attention;
generating, via span level attention smoothing, an expected passage attention from the passage to program attention at the respective step of the program form; and
generating the span prediction logit by multi-scaled stacked attention based soft span prediction.

15. The system of claim 11, wherein the first set of numerical entities includes numbers and dates in the passage, and the operations further comprise:
generating a passage-to-number and/or a passage-to-date attention at each step of the program form; and
generating a loss objective taking a log-form of cumulative likelihood of attention distribution of the passage-to-number and/or a passage-to-date attention.

16. The system of claim 11, wherein the subset of numerical entities are sampled as discrete arguments given entity-specific stacked attentions.

17. The system of claim 16, wherein the generating the output answer by executing one or more discrete operations comprises leveraging a combination of neural and discrete modules.

18. The system of claim 15, wherein the operations further comprise training the question-answering neural network using the output answer as supervision in a reinforcement learning (RL) framework.

19. The system of claim 18, wherein the RL framework used for end-to-end training of the question-answering neural network is a contextual multi-arm bandit form with a 1-step Markov Decision Process.

20. The system of claim 18, wherein the operations further comprise:
updating parameters of the question-answering neural network by maximizing an expected reward and minimizing the loss objective.

* * * * *